US011853196B1

(12) United States Patent
Pandurangarao

(10) Patent No.: US 11,853,196 B1
(45) Date of Patent: Dec. 26, 2023

(54) ARTIFICIAL INTELLIGENCE DRIVEN TESTING

(71) Applicant: Allstate Insurance Company, Northbrook, IL (US)

(72) Inventor: Anil Kumar Pandurangarao, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/032,411

(22) Filed: Sep. 25, 2020

Related U.S. Application Data

(60) Provisional application No. 62/906,864, filed on Sep. 27, 2019.

(51) Int. Cl.
*G06F 9/44* (2018.01)
*G06F 11/36* (2006.01)
*G06F 8/51* (2018.01)

(52) U.S. Cl.
CPC ............ *G06F 11/3688* (2013.01); *G06F 8/51* (2013.01); *G06F 11/368* (2013.01); *G06F 11/3692* (2013.01)

(58) Field of Classification Search
None
See application file for complete search history.

(56) References Cited

U.S. PATENT DOCUMENTS

| 8,935,654 | B2 | 1/2015 | Sengupta et al. |
| 9,021,442 | B2 * | 4/2015 | Rossi ................. G06F 11/3664 717/125 |
| 10,049,030 | B2 | 8/2018 | Shukla et al. |
| 10,073,763 | B1 | 9/2018 | Raman et al. |
| 10,169,331 | B2 * | 1/2019 | Baron-Palucka ....... H04L 67/42 |
| 10,204,033 | B2 * | 2/2019 | Simoni ............... G06F 11/3676 |
| 10,339,036 | B2 * | 7/2019 | Dwarakanath ...... G06F 11/3684 |
| 10,372,592 | B2 | 8/2019 | Champlin-Scharff et al. |
| 10,417,120 | B2 | 9/2019 | Maag et al. |
| 10,564,939 | B2 | 2/2020 | Makkar |
| 10,635,574 | B1 | 4/2020 | Damen |

(Continued)

FOREIGN PATENT DOCUMENTS

| CN | 104615533 A | 5/2015 |
| CN | 105955889 A | 9/2016 |

(Continued)

OTHER PUBLICATIONS

Chetna Sharma et al., "Mechanism for Identification of Duplicate Test Cases", May 2014 (Year: 2014).*

(Continued)

*Primary Examiner* — Wei Y Zhen
*Assistant Examiner* — Lanny N Ung
(74) *Attorney, Agent, or Firm* — Dinsmore & Shohl LLP

(57) ABSTRACT

Methods, computer-readable media, software, and apparatuses may determine source code keywords via analysis of a source code file, map the source code keywords to test keywords, based on a similarity between the source code keywords and the test keywords, wherein the test keywords are associated with test cases, and cause execution of one or more of the test cases. Artificial intelligence driven testing utilizes artificial intelligence in analysis of source code and may automatically select and perform tests on the source code based on results of the analysis.

18 Claims, 7 Drawing Sheets

(56) References Cited

U.S. PATENT DOCUMENTS

| | | | |
|---|---|---|---|
| 10,684,943 B2 | 6/2020 | Fei et al. | |
| 2005/0015675 A1* | 1/2005 | Kolawa | G06F 11/3688 |
| | | | 714/38.14 |
| 2006/0236301 A1* | 10/2006 | Minium | G06F 8/71 |
| | | | 717/101 |
| 2008/0222501 A1* | 9/2008 | Travison | G06F 11/366 |
| | | | 714/819 |
| 2014/0173561 A1* | 6/2014 | Toub | G06F 8/73 |
| | | | 717/123 |
| 2014/0289675 A1* | 9/2014 | Stading | G06Q 10/10 |
| | | | 715/810 |
| 2014/0380277 A1* | 12/2014 | Bhagavatula | G06F 11/3684 |
| | | | 717/124 |
| 2015/0363294 A1 | 12/2015 | Carback, III et al. | |
| 2016/0321586 A1* | 11/2016 | Herzig | G06Q 10/06313 |
| 2016/0378445 A1* | 12/2016 | Kashiwagi | G06F 8/77 |
| | | | 717/143 |
| 2018/0095867 A1* | 4/2018 | Varadarajan | G06F 11/3688 |
| 2019/0196952 A1* | 6/2019 | Manchiraju | G06N 3/088 |
| 2019/0294528 A1* | 9/2019 | Avisror | G06F 8/60 |
| 2020/0019488 A1 | 1/2020 | Singh et al. | |
| 2020/0117584 A1 | 4/2020 | Maseedu et al. | |
| 2020/0151089 A1 | 5/2020 | Bakshi et al. | |

FOREIGN PATENT DOCUMENTS

| | | |
|---|---|---|
| CN | 106294186 A | 1/2017 |
| CN | 108170468 A | 6/2018 |
| CN | 109144879 A | 1/2019 |
| CN | 110347603 A | 10/2019 |
| CN | 110908919 A | 3/2020 |

OTHER PUBLICATIONS

Kamalakar, "Automatically Generating Tests from Natural Language Descriptions of Software Behavior", Virginia Polytechnic Institute and State University, Master of Science in Computer Science and Applications, Sep. 23, 2013, 72 pages.

Azzazi, "A Framework Using NLP to Automatically Convert User-Stories into Use Cases in Software Projects", IJCSNS International Journal of Computer Science and Network Security, vol. 17, No. 5, May 2017, pp. 71-76.

* cited by examiner

| SoureCodeKeywords |
|---|
| adccoveragecd |
| coveragecode |
| includes |
| case |
| deductible |
| insured |
| path |
| payment |
| label |
| value |
| header |
| json |
| splitparts |
| else |
| string |

610

| StopWords |
|---|
| else |
| string |
| case |
| value |
| getvalue |
| header |
| response |
| label |
| path |
| node |
| configure |
| title |
| includes |
| package |
| bind |
| local |
| json |
| getState |
| pid |

620

| RemainingSoureCodeKeywords |
|---|
| adccoveragecd |
| coveragecode |
| deductible |
| insured |
| payment |
| splitparts |

| SoureCodeKeyword | TestKeywords |
|---|---|
| adccoveragecd | UMPDcoverage<br>CC<br>CD<br>Age |
| coveragecode | EarthquakeCoverage<br>HomeEnterpriseCoverage<br>MakeCoverageInconsistent<br>PersonalPropReimbCoverage<br>BuildingCodesCoverage<br>Age<br>LengthOfContinousCoverage<br>WrapAroundCoverage |
| deductible | TI |
| insured | InsuredFiveYeatsOrMoreWithIA<br>UninsuredMotoristEconomicOption<br>IsApplicantNamedInsured<br>InsureSameProperty<br>PolicyUninsuredUnderinsuredMotorist<br>PolicyUninsuredUnderinsuredMotoristBodilyInjury<br>PolicyUninsuredUnderinsuredBodilyInjury<br>UnInsuredOrUnderInsuredMotoristBodilyInjury<br>SU<br>PrimaryResidentInsured<br>ResidenceToBeInsured<br>QuestionAdditionalInsured<br>AddPremisebyNamedInsured<br>InsureDwellingActualCashOrReplacementCost |
| payment | ResponsiblePayment<br>PaymentMethod<br>PaymentFrequency<br>PaymentMode<br>MedicalPayment<br>LatePaymentCharge<br>CurrentPaymentFrequency<br>DeniedPaymentDueToFraudInd |
| splitparts |  |

FIG. 7

| Test_Cases | AddPremisebyNamedInsured | Age | BuildingCodesCoverage | CC | CD | CurrentPaymentFrequency | DeniedPaymentDueToFraudInd | EarthquakeCoverage |
|---|---|---|---|---|---|---|---|---|
| Test_Case_1 |  | x |  |  |  |  |  |  |
| Test_Case_2 |  |  |  |  |  | x |  |  |
| Test_Case_3 | x | x |  |  |  |  |  | x |
| Test_Case_4 | x | x |  |  |  |  |  | x |
| Test_Case_5 |  |  |  |  | x |  |  |  |
| Test_Case_6 |  | x |  |  | x |  |  |  |
| Test_Case_7 |  |  | x |  |  | x |  |  |
| Test_Case_8 | x |  |  | x |  |  |  |  |
| Test_Case_9 |  | x |  |  |  |  |  |  |
| Test_Case_10 |  |  |  |  |  |  |  | x |
| Test_Case_11 | x | x |  |  |  |  |  |  |
| Test_Case_12 |  |  |  |  |  |  |  |  |
| Test_Case_13 |  | x |  |  |  |  |  |  |
| Test_Case_14 |  | x |  |  |  |  | x |  |
| Test_Case_15 |  |  |  |  |  |  | x |  |
| Test_Case_16 | x |  |  |  |  |  |  |  |
| Test_Case_17 |  |  |  |  | x |  |  |  |

ARTIFICIAL INTELLIGENCE DRIVEN TESTING

CROSS-REFERENCE TO RELATED APPLICATIONS

This application claims the benefit of and priority to U.S. Provisional Patent Application Ser. No. 62/906,864, filed Sep. 27, 2019, and entitled "Artificial Intelligence Driven Testing," the contents of which is incorporated herein by reference in its entirety for all purposes.

FIELD OF ART

Aspects of the disclosure relate to computer hardware and software. In particular, one or more aspects of the disclosure relate to artificial intelligence driven testing of software.

BACKGROUND

Software development typically involves several activities or phases, some of which may be completed in series. For example, software engineers may follow a waterfall model, where a project's requirements, design, implementation, and test may be conducted as an ordered set of phases. Alternatively, an agile approach may be followed in which features may be incrementally developed and tested. In either approach, during the test phase, a test team may execute functional tests following a release of source code, in order to verify that the software works as expected. For large software projects, the test phase may be lengthy, as it may involve the execution of a large number of tests. For an example, the test phase in a large software project might require six weeks to complete.

As new features are implemented, in order to save time, software engineers sometimes select, using ad-hoc methods, a subset of tests to run to test new features. However, the software engineer may not be aware of available tests, or tests that may be applicable, and the subset of tests selected may not optimally test the features. Therefore, the ad-hoc testing may fail to catch software errors and non-compliances, and may not be optimal with regards to time and effort spent by the software engineer.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure include methods, computer-readable storage media, software, systems, and apparatuses for artificial intelligence driven testing (AIDT). In particular, source code may be analyzed to identify source code keywords, which may then be mapped to test keywords that have been associated with test cases. In some aspects, the test cases may be executed to test the source code.

In some aspects, the source code keywords may be determined by using artificial intelligence, including by use of natural language processing of the source code.

In some aspects, the mapping of the source code keywords to the test keywords may include determining a similarity ratio between a source code keyword and a test keyword, and determining that the source code keyword maps to the test keyword, based on a determination that the similarity ratio meets a predetermined threshold.

In some aspects, the test cases may be executed to functionally test the source code, before the software engineer commits the source code to a version control system, making it visible to other developers or testers. The results of the tests may be analyzed by use of a machine learning algorithm that has been trained on causes of previous test failures, and test failures may be categorized, based on the analysis.

BRIEF DESCRIPTION OF THE DRAWINGS

The present invention is illustrated by way of example and is not limited by the accompanying figures in which like reference numerals indicate similar elements and in which:

FIG. 6 illustrates examples of source code keywords, stop words, and remaining source code keywords, in accordance with one or more aspects described herein.

FIG. 7 illustrates an example mapping of source code keywords to test keywords in accordance with one or more aspects described herein.

FIG. 8 illustrates an example table associating test cases with test keywords in accordance with one or more aspects described herein.

DETAILED DESCRIPTION

In accordance with various aspects of the disclosure, methods, computer-readable media, software, and apparatuses are disclosed for using artificial intelligence in software testing.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

AIDT may include a software testing strategy, and an agile model, which enables software developers to realize faster and more efficient software tests, among other benefits. AIDT utilizes artificial intelligence (AI), and may perform tests based on AI analysis, to make testing cycle times shorter. With AIDT, testing can be automated, based on AI and machine learning, enabling better testing practices and ensuring better quality software while reducing time to release.

Figure 1:
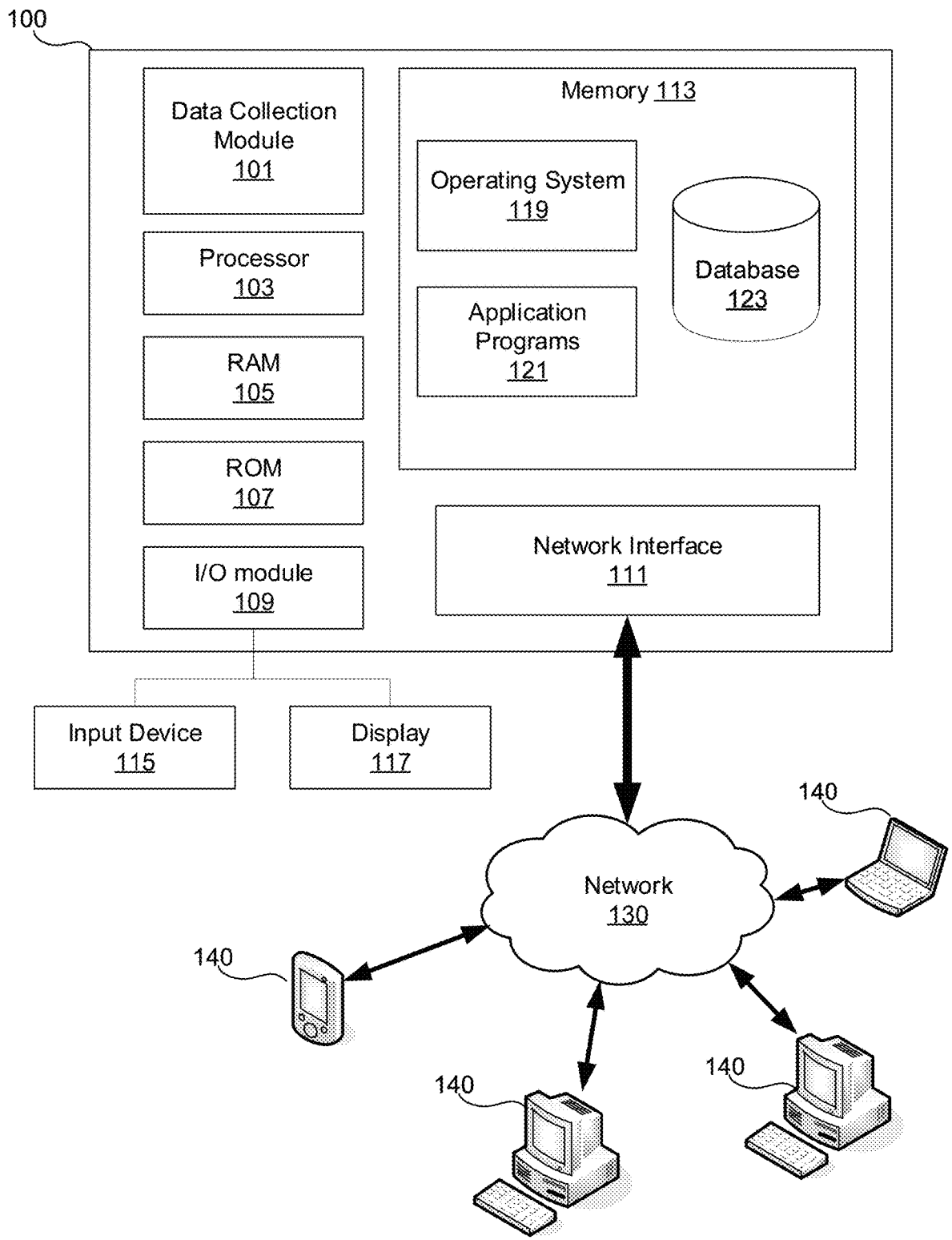
FIG. 1 illustrates an example computing device that may be used in accordance with one or more aspects described herein.

In one or more arrangements, aspects of the present disclosure may be implemented with a computing device. FIG. 1 illustrates a block diagram of an example computing device 100 that may be used in accordance with aspects described herein. The computing device 100 may be a server, personal computer (e.g., a desktop computer), laptop computer, notebook, tablet, smartphone, home management devices, home security devices, smart appliances, etc. The computing device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, computing device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the computing device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100; however, they may be within the same structure. On some computing devices 100, the input device 115 may be operated by users to interact with the data collection module 101, including providing user information and/or preferences, account information, vehicle sharing requests and/or offers, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 may allow the computing device 100 to connect to and communicate with a network 130. The network 130 may be any type of network, including a local area network (LAN) and/or a wide area network (WAN), such as the Internet, a cellular network, or a satellite network. Through the network 130, the computing device 100 may communicate with one or more other computing devices 140, such as laptops, notebooks, smartphones, tablets, personal computers, etc. The computing devices 140 may also be configured in a similar manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

Figure 2:
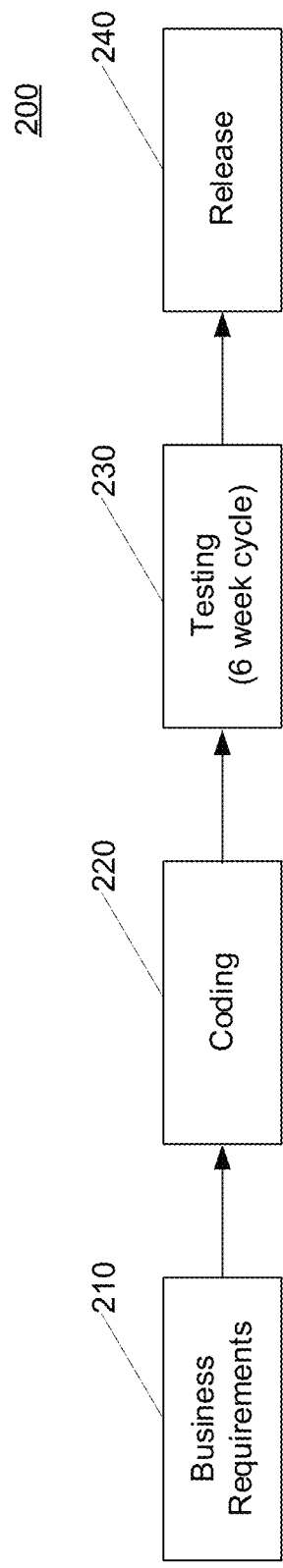
FIG. 2 illustrates a software development process using traditional software testing models.

FIG. 2 illustrates a software development process 200 using conventional software testing models. There may be a business requirement phase 210, followed by a coding phase 220, then a testing phase 230 using traditional testing models, and finally, a release phase 240. Traditional testing models are based on requirements driven testing, which is a non-agile way of testing. This type of software testing may require a testing cycle of at least 6-8 weeks for large projects. Additional software releases will add additional testing time.

Figure 3:
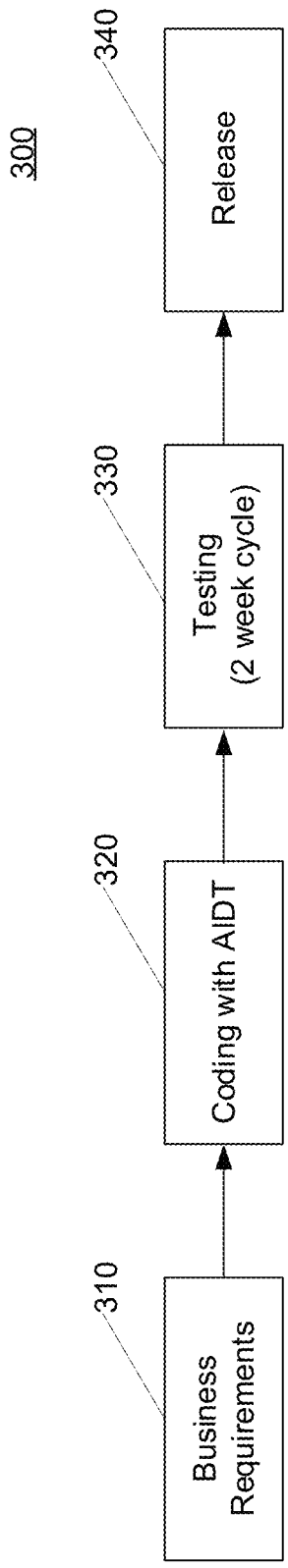
FIG. 3 illustrates a software development process using AIDT in accordance with one or more aspects described herein.

FIG. 3 illustrates a view of a software development process 300 wherein the testing phase has been shortened in accordance with embodiments as disclosed herein. As illustrated, there may be a business requirement phase 310, followed by a coding with AIDT phase 320, then a testing phase 330, and a release phase 340. Coding with AIDT 320 may enable a much shorter traditional testing cycle, for example, two weeks may be all that is needed, even for large projects.

The coding with AIDT phase 320 may, in some embodiments, comprise an AIDT component to perform the AIDT aspects of the phase. Input to the AIDT component may include source code, a previous version of the source code, feature names, product names, release name, release date, release notes, tags or labels from a bug/issue tracking system, component names, version control system information, continuous integration continuous delivery/development (CICD) pipeline information, product build, and/or scripts to invoke functionality of the AIDT component.

Figure 4:
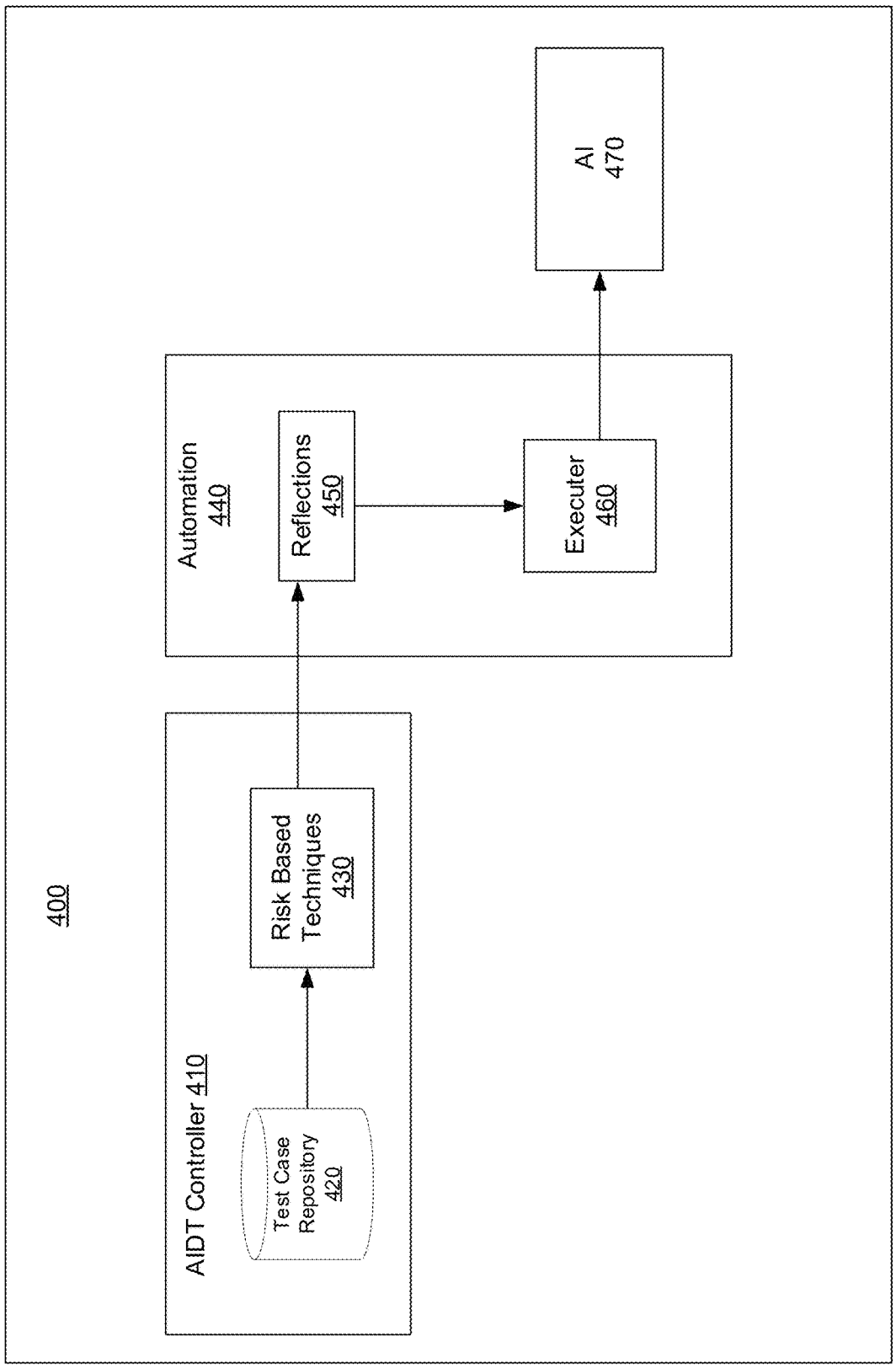
FIG. 4 illustrates a detailed view of AIDT components in accordance with one or more aspects described herein.

FIG. 4 illustrates, as AIDT 400, a detailed view of the AIDT component of the coding with AIDT phase 320 shown in FIG. 3, as may be found in some embodiments. Several software components, such as the AIDT controller 410, the automation module 440, and an AI module 470 are illustrated, while additional or fewer software components may be present, in various embodiments. These software components may be implemented in computing device 100 of FIG. 1, for example.

As an overview, the AIDT 400 may, in some embodiments, function as follows. Differences between a previous source code file and an updated source code file may be determined, the updated source code file containing changes to the source code, such as new source code or modifications to existing source code elements. Source code keywords are obtained from the differences between these two files, determined by comparing the two files. Source code keywords may be words found in the source code changes, words found in comment fields, file names, class names, and/or method names (function names), etc. In some embodiments, natural language processing (NLP) may be used to determine the source code keywords. For example, in some embodiments, an NLP clustering algorithm, based on the Latent Dirichlet Allocation (LDA) statistical model, may be used to obtain the source code keywords. Uninteresting keywords may be discarded, to reduce the set to meaningful source code keywords. The remaining set of source code keywords may be mapped, or matched to, test keywords. For example, one or more test keywords may be similar to a new class name in the source code. The test keywords are words that have been previously associated with tests. By use of the matched test keywords, the corresponding tests can be located and executed, in order to test the source code differences noted above. For example, test keywords similar to the class name may correspond to test cases that test the functionality of the class. The test results may be analyzed in light of previous test failures in order to categorize the any test failures.

The AIDT controller 410 may include, or have access to, a test case repository 420, which may be stored in a database, such as database 123 of FIG. 1. As will be further discussed below, the test cases in the test repository may be associated with test keywords, which correspond to the features tested by the test cases. In some embodiments, a table or spreadsheet may associate test keywords to test cases.

The AIDT controller 410 may include a risk-based techniques module 430 for selecting a minimized subset of tests for testing a software feature. Output from the AIDT controller 410 may include the identification of test cases or automated test scripts. These test cases or automated test scripts may be a subset of the test cases in the test case repository 420. In some embodiments, scripts may be used to invoke these test cases on a build/CICD pipeline at a developer integrated developer environment (IDE).

The automation module 440 may receive test case identifiers and may cause automatic execution of those test cases. In some embodiments, a reflections module 450 may identify test case software, based on the test case identifiers. For example, a reflection API in the Java programming language may be used to identify a test case package corresponding to a test case identifier. Executer 460 may cause execution of the test cases. Output of the Automation module 440 may include test results from executing the identified test cases.

Test results may be input to an AI module 470 for further analysis. In some embodiments, the AI module 470 may include a machine learning algorithm that has been trained on the causes of previous test failures, and may analyze results of the executed tests and categorize any failures.

Artificial intelligence driven testing may be performed by a software engineer during development of a software feature or application. By using AIDT to accomplish automated testing during the development phase, the testing can be conducted earlier than is typically done. A developer may invoke AIDT prior to checking newly developed software into a version control system. In some embodiments, AIDT may be automatically triggered when a developer tries to commit or release source code into a branch in a version management system. In these embodiments, check-in/commit/release of source code may be dependent on the passing of the tests during AIDT.

Figure 5:
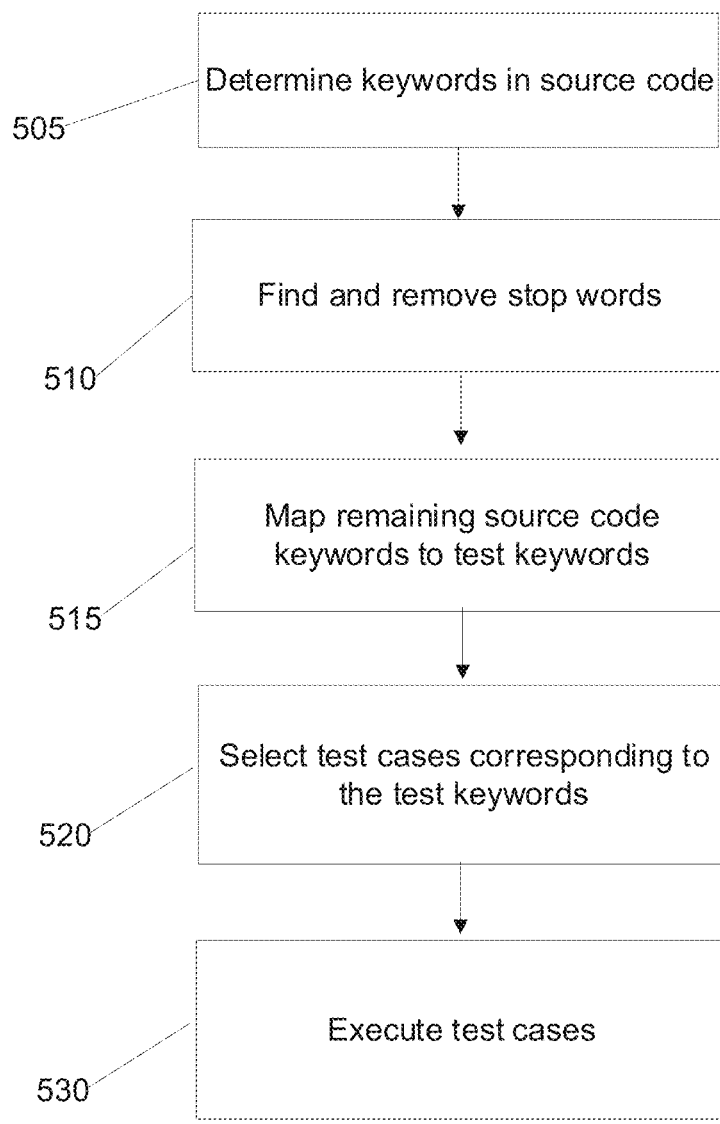
FIG. 5 illustrates an example method for performing AIDT, in accordance with one or more aspects described herein.

FIG. 5 illustrates a process 500 for performing AIDT 400. At step 505 source code keywords may be determined. The source code keywords may be words found in source code that is to be tested. In some embodiments, the source code may represent the implementation of one or more new features. In some embodiments, a comparison may be made between the source code and a previous version of the source code, so that a difference may be determined, and the source code keywords may correspond to new keywords that were not found in the prior version. For example, source code in a developer code based on a release branch in a version management system may be compared to the main line to determine what software changes are in the release branch (e.g. new features or new/modified code). In some embodiments, the source code keywords may be found via a scan of the source code using natural language processing (NLP), including modeling/clustering topics in the source code based on a Latent Dirichlet Allocation (LDA) model.

At step 510, the source code keywords may be compared to a pre-determined listing of stop words, and any source code keywords matching a word listed in the stop words listing may be removed from the source code keywords. The stop words listing may contain words that have been deemed not interesting for testing purposes. For example, the stop words may contain common software programming language reserved words, such as "else", "string," and "includes." The stop words listing may be hand-developed during a software project, based on words determined to be uninteresting for testing purposes. In some embodiments, a portion of the stop words may be considered generic, such that they may be used with other software projects. In some embodiments, the stop words may be directly related to the software language in use by the developers on the project. For example, particular words may be reserved words in the Java programming language, while different words may be reserved in the C programming language. After removal of the source code keywords matching words listed in the stop words listing, remaining source code keywords may correspond to variable names, function names, and/or comments that were found in the source code.

At step 515, the remaining source code keywords may be mapped to test keywords. For example, each test case in the test case repository 420 may be assigned one or more test keywords, each representative of the subject matter tested by the test case. The test case keywords may be manually assigned to the test cases by members of a test team, for example. The mapping of the source code keywords to the test keywords may be performed using any means capable of finding similarities between text strings. In some embodiments the source code keywords may be compared to the test keywords using functions provided by the Fuzzywuzzy library, which is a library of the Python programming language that may be used for measuring the similarity between two strings. The Fuzzywuzzy library uses Levenshtein distance to determine a ratio indicative of the similarity between two strings. Continuing the example, the Fuzzywuzzy library may be used to find a similarity ratio between each source code keyword and each test keyword. A ratio above a pre-determined number may be determined to be a match. For example, a ratio of 70 or more may be considered a match, in some embodiments. Any test keyword that has been matched to a source code keyword may be referred to as a matched test keyword or a mapped test keyword. It should be understood that more than one test keyword may be mapped to a source code keyword.

At step 520, matched test keywords may be used to identify corresponding test cases. For example, each matched test keyword may be looked up in a table, as will be described in more detail below, to obtain a corresponding test case identifier. A reflection API in the Java programming language may be used to identify a test package name corresponding to a test case identifier.

At step 530, the identified tests may be executed to test the source code. In some embodiments, all of the identified tests may be executed. In some other embodiments, a risk-based algorithm may be used, in order to reduce the number of test cases to be executed while still providing acceptable test coverage. For example, if the source code includes a dropdown type of data select field, then, using the risk-based algorithm, multiple test cases may be identified to cover several different options available in the dropdown field. Given an example dropdown data select field of integer values (e.g. a range-related dropdown list), values representing an upper limit, a lower limit, and a mid-value may be selected for testing. If a free-form field is in the source code, in some embodiments, a single test case with a random value may be identified. If the field in the source code is an integer-based value, then test cases may be selected to cover maximum, minimum, first half, and second half range values. Those skilled in the art will appreciate that various other values and/or selections may be used by the risk-based algorithm in accordance with the disclosure herein. By applying the risk-based algorithm to identify a minimum set of test cases out of all matched test cases, test cases with duplicate coverage may be eliminated.

FIG. 6 illustrates examples of the source code keywords listing 610, the stop words listing 620, and the remaining source code keywords listing 630, as discussed above, for an example implementation of an insurance-related application. It should be understood that illustrated are some example stop words, source code keywords, etc., and additional or alternative words may be used without departing from the invention. Source code keywords may be the result of step 505 discussed above, and in the example provided, include words such as adccoveragecd, coveragecode, includes, case, etc. as can be seen in the source code keywords listing 610. As discussed above, these source code keywords are words found in the source code, for example, by natural language processing (NLP) of the source code.

The stop words listing 620 illustrates words that have been previously identified as not interesting from a testing perspective, or as words that should not be included when matching source code keywords to test keywords. Referring to the example stop words listing 620, it can be seen that some common programming language reserved words are included in the stop words listing 620. For example, words such as else, string, case, value, getvalue, and header are included in the stop words listing 620. These words may be words typically found in a programming language and, as such, these words may not convey any useful information with regards to test case selection.

The remaining source code keywords listing 630, which may be the result of step 510 above, illustrates an example remaining source code keyword listing obtained by removing stop words 620 from the source code keywords 610.

FIG. 7 illustrates an example mapping 700 of the remaining source code keywords 630 to test keywords. The mapping 700 may be the result of step 515 discussed above. For example, test keywords that have previously been associated with test cases may be matched with the source code keywords. In some embodiments, as is shown in FIG. 8, the test keywords may be listed as column headings in a table or spreadsheet, with test case identifiers listed in rows, and indications in various rows and columns to show the correspondence of a test keyword with the associated test case identifier. In these embodiments, the test keywords may be gathered from the column headings of the spreadsheet for mapping with the source code keywords.

It can be seen that, in the example mapping 700, test keywords having characters matching characters in the source code keywords have been determined to be matches. For example, it can be seen that test keywords UMPDcoverage, CC, CD, and Age have been matched to source code keyword adccoveragecd, while source keyword "coveragecode" maps to EarthquakeCoverage and several other test keywords. Each of these test keywords matches with a subset of characters in the source code keyword. Note that the source code keyword "splitparts" does not have a corresponding test keyword listed. This simply means that no test keywords were found that map to this source code keyword. A software engineer may use this as an indication that either "splitparts" may be a candidate for inclusion in the stop keywords, or that one or more new tests may be needed for testing this source code keyword.

FIG. 8 illustrates an example table 800 of test case identifiers and corresponding test keywords. This table 800 may be assembled and maintained by a test team or by software engineers. The purpose of the table is to associate test keywords with test case identifiers that are related to those keywords. For example, Test_Case_3, Test_Case_4, and Test_Case_11 are each associated with the test keyword EarthquakeCoverage. Accordingly, test cases associated with these test case identifiers test software features related to EarthquakeCoverage.

As discussed above in step 520, once the remaining source code keywords have been mapped to test keywords, these test keywords can be used to obtain the corresponding test cases for execution. Continuing the example from the paragraph above, test keyword EarthquakeCoverage can be used to obtain the identification of the test cases for testing related to this test keyword. As such, by referring to the example table 800, Test_Case_3, Test_Case_4, and Test_Case_11 can be identified for execution. Once the test case name has been identified, a corresponding package name may be obtained, and a test suite file may be generated at runtime, which may then be used in an automated testing framework for performing the tests. In some embodiments, these tests may be automatically executed via test scripts.

Accordingly, given the above description, it can be understood how changes in source code of a software application can lead to the automatic selection of functional test cases for testing the changes.

In some embodiments, a regression algorithm may be used to analyze test script failures. For example, a machine learning algorithm that has been trained on causes of previous test failures may be used to analyze results of the executed tests and categorize any failures. In some embodiments, failures may be categorized into a number of categories according to the cause of the failure, including categories for sync issues, source code change issue, build/test environment issue, and new feature introduction issue. In some embodiments, testing may continue, or be considered as "passed," with failures in certain categories being allowed/ignored. In addition, a number of failing tests may be indicated, either as a numeral or as a percentage of tests run.

Several advantages may be realized by use of AIDT. For example, software testing with AIDT may be fully automated; testing may be limited to impacted features, making testing more efficient; faster test cycles may be realized; AIDT fits well with MVP agile delivery or releases; and provides ease of maintenance.

Aspects of AIDT may be implemented in a cloud storage and/or computing environment.

In some embodiments, the AIDT may affect many or all aspects of software testing. AIDT may allow organizations to effectively record, monitor, and govern product functional standards in compliance with business requirements, enabling faster release cycles of software products.

Aspects of the invention have been described in terms of illustrative embodiments thereof. Numerous other embodiments, modifications, and variations within the scope and spirit of the description will occur to persons of ordinary skill in the art from a review of this disclosure. For example, one of ordinary skill in the art will appreciate that the steps disclosed in the description may be performed in other than the recited order, and that one or more steps may be optional in accordance with aspects of the invention.

What is claimed is:

1. A method comprising:
   initiating a release of a source code file into a branch in a version control system;
   triggering, automatically and without user intervention, artificial intelligence driven testing of the source code file based on the initiating and prior to the release, the artificial intelligence driven testing including:
   determining by a computing device, one or more source code keywords via analysis of the source code file;
   removing at least one stop word from the source code keywords to obtain at least one remaining source code keyword;
   mapping the at least one remaining source code keyword to one or more test keywords, based on a similarity between the at least one remaining source code keyword and the one or more test keywords, wherein the one or more test keywords are associated with one or more test cases;
   using a risk based algorithm for identifying a minimum set of the one or more test cases for reducing duplicate coverage; and
   eliminating at least one of the one or more test cases with duplicate coverage from the one or more test cases based on the minimum set of the one or more test cases as identified;
   causing execution of the minimum set of the one or more test cases; and
   releasing the source code file into the branch in the version control system upon at least one of the minimum set of the one or more test cases satisfying a passing threshold, wherein the passing threshold is a predetermined combination of the tests performed during the artificial intelligence driven testing, and the predetermined combination of the tests are a subset of the tests performed during artificial intelligence driven testing.

2. The method of claim 1, wherein the mapping the at least one remaining source code keyword to the one or more test keywords comprises:
   determining a similarity ratio between the at least one remaining source code keyword and a test keyword of the one or more test keywords; and
   determining that the at least one remaining source code keyword maps to the test keyword based on a determination that the similarity ratio meets a predetermined threshold.

3. The method of claim 1, wherein the determining of the one or more source code keywords comprises determining the one or more source code keywords by natural language processing of the source code file.

4. The method of claim 1, wherein after the causing of the execution of the minimum set of the one or more test cases, the method further comprises:
   enabling check-in of the source code file to the version control system.

5. The method of claim 1, wherein the one or more test keywords comprise one or more text strings located in one or more column headings of a table and wherein one or more test case identifiers corresponding to the one or more test cases are located in one or more rows of the table, and wherein the one or more test case identifiers are associated with the one or more test keywords by one or more entries in the table.

6. The method of claim 1, further comprising:
   analyzing, by use of a machine learning algorithm that has been trained on one or more causes of one or more previous test failures, one or more test script failures associated with the one or more test cases; and
   based on the analyzing, categorizing at least one test script failure as a sync issue, a source code change issue, a test environment issue, or a new feature introduction issue.

7. A method comprising:
   initiating a release of a source code file into a branch in a version control system;
   triggering, automatically and without user intervention, artificial intelligence driven testing of the source code file based on the initiating and prior to the release, the artificial intelligence driven testing including:
   comparing, by a computing device, source code of the source code file to a previous version of the source code;
   based on the comparing, determining one or more source code keywords in the source code, wherein the one or more source code keywords comprise one or more function names found in the source code;
   mapping at least one of the one or more source code keywords to one or more test keywords, based on a similarity between the at least one of the one or more source code keywords and the one or more test keywords, wherein the one or more test keywords are associated with one or more test case identifiers;
   selecting one or more test cases from a test repository, wherein the one or more test cases are associated with the one or more test case identifiers;
   using a risk based algorithm for identifying a minimum set of the one or more test cases for reducing duplicative coverage;
   eliminating at least one of the one or more test cases with duplicate coverage from the one or more test cases based on the minimum set of the one or more test cases as identified;
   causing execution of the minimum set of the one or more test cases; and
   releasing the source code file into the branch in the version control system upon at least one of the minimum set of the one or more test cases satisfying a passing threshold, wherein the passing threshold is a predetermined combination of the tests performed during the artificial intelligence driven testing, and the predetermined combination of the tests are a subset of the tests performed during artificial intelligence driven testing.

8. The method of claim 7, wherein the mapping of the at least one of the one or more source code keywords to the one or more test keywords, based on the similarity between the at least one of the one or more source code keywords and the one or more test keywords, comprises:
  determining a similarity ratio between the at least one of the one or more source code keywords and a test keyword of the one or more test keywords, wherein the similarity ratio is based on a Levenshtein distance between the at least one of the one or more source code keywords and the test keyword; and
  determining that the at least one of the one or more source code keywords maps to the test keyword based on a determination that the similarity ratio meets a predetermined threshold.

9. The method of claim 8, wherein the predetermined threshold is 70.

10. The method of claim 7, wherein the determining of the one or more source code keywords in the source code comprises:
  determining one or more candidate words by natural language processing of the source code;
  discarding one or more of the one or more candidate words matching predetermined one or more stop words; and
  identifying one or more of the remaining one or more candidate words as the one or more source code keywords.

11. The method of claim 7, wherein after the causing of the execution of the minimum set of the one or more test cases, further comprises:
  enabling check-in of the source code to the version control system.

12. The method of claim 7, wherein the one or more test keywords comprise one or more text strings located in one or more column headings of a table and wherein the one or more test case identifiers are located in rows of the table, and wherein the one or more test case identifiers are associated with the one or more test keywords by one or more entries in the table.

13. The method of claim 7, further comprising:
  analyzing, by use of a machine learning algorithm that has been trained on one or more causes of previous one or more test failures, one or more test script failures associated with the one or more test cases; and
  based on the analyzing, categorizing at least one test script failure as a sync issue, a source code change issue, a test environment issue, or a new feature introduction issue.

14. A method comprising:
  initiating a release of a source code file into a branch in a version control system;
  triggering, automatically and without user intervention, artificial intelligence driven testing of the source code file based on the initiating and prior to the release, the artificial intelligence driven testing including:
    comparing, by a computing device, source code of the source code file to a previous version of the source code, in order to identify new source code;
    analyzing, by use of natural language processing (NLP), the new source code to identify one or more source code keywords, wherein the one or more source code keywords comprise one or more function names found in the source code;
    removing at least one stop word from the one or more source code keywords to obtain at least one remaining source code keyword;
    mapping the at least one remaining source code keyword to one or more test keywords, by determining a similarity ratio between each source code keyword and each test keyword, wherein the similarity ratio is based on a Levenshtein distance between the source code keyword and the test keyword, and wherein the one or more test keywords are associated with one or more test case identifiers;
    selecting one or more test cases from a test repository, wherein the one or more test cases that are selected are associated with the one or more test case identifiers;
    using a risk-based algorithm to identify a minimum set of the one or more test cases for reducing duplicate coverage;
    eliminating at least one of the one or more test cases with duplicate coverage from the test cases based on the minimum set of the one or more test cases as identified;
    causing execution of the minimum set of the one or more test cases;
  releasing the source code file into the branch in the version control system upon at least one of the minimum set of the one or more test cases satisfying a passing threshold, wherein the passing threshold is a predetermined combination of the tests performed during the artificial intelligence driven testing, and the predetermined combination of the tests are a subset of the tests performed during artificial intelligence driven testing.

15. The method of claim 14, wherein the natural language processing comprises an NLP clustering algorithm, based on a Latent Dirichlet Allocation (LDA) statistical model.

16. The method of claim 14, wherein the one or more test keywords comprise one or more text strings located in one or more column headings of a table and wherein the one or more test case identifiers are located in one or more rows of the table, and wherein the one or more test case identifiers are associated with the one or more test keywords by one or more entries in the table.

17. The method of claim 14, wherein the risk-based algorithm identifies the minimum set of the one or more test cases for testing limits of a range-related dropdown list in the source code.

18. The method of claim 14, further comprising:
  using a machine learning algorithm that has been trained on one or more causes of one or more previous test failures, analyzing one or more test script failures; and
  categorizing at least one test script failure as a sync issue, a code change issue, a build/test environment issue, or a new feature introduction issue.

* * * * *